United States Patent [19]

Cohen

[11] Patent Number: 5,438,505

[45] Date of Patent: Aug. 1, 1995

[54] ADAPTIVE CONTROL METHOD FOR POWER CONVERTERS

[75] Inventor: Isaac Cohen, Dix Hills, N.Y.

[73] Assignee: Lambda Electronics, Inc., Melville, N.Y.

[21] Appl. No.: 92,284

[22] Filed: Jul. 15, 1993

Related U.S. Application Data

[63] Continuation of Ser. No. 815,763, Jan. 9, 1992, abandoned, which is a continuation-in-part of Ser. No. 650,733, Feb. 5, 1991, abandoned.

[51] Int. Cl.$^6$ ............................................. G05F 1/565
[52] U.S. Cl. ..................................... 363/95; 323/275; 323/285; 323/287
[58] Field of Search ............... 323/222, 285, 286, 275, 323/276, 277, 279, 287, 207; 363/21, 97, 98, 95; G05F 1/56, 1/563, 1/565

[56] References Cited

U.S. PATENT DOCUMENTS

| | | | |
|---|---|---|---|
| 4,600,984 | 7/1986 | Cohen | 363/97 |
| 4,891,569 | 1/1990 | Light | 323/210 |
| 4,940,929 | 7/1990 | Williams | 323/222 |
| 5,132,606 | 7/1992 | Herbert | 323/266 |

OTHER PUBLICATIONS

An Adaptive Control Switching Buck Regulator—Implementation, Analysis and Design—IEEE Jan. 1980 Lee et al pp. 84–99 vol. AES 16 No. 1.

H. M. El-Bolok, let al., "A Microprocessor-Based Adaptive Power Factor Corrector for Nonlinear Loads," IEEE Transaction on Industrial Electronics and Control Instruments, vol., 37, No. 1, Feb. 1990, New York, US, pp. 77–81.

M. A. El-Sharkawi, et al., "Development and Filed Testing of a Closed Loop Adaptive Power Factor Controller," IEEE Transaction on Energy Conversion, vol. 3, No. 2, Jun. 1988, New York, US, pp. 235–240.

J. B. Williams, "Design of Feedback Loop in Unity Power Factor AC to DC Converted," PESC 1989 Record, vol, II, 20th Annual IEEE Power Electronics Specialists Conference, Jun. 29, 1989, Milwaukee, Wis., US, pp. 959–967.

M. Kazerani, et al., "A Novel Active Current Waveshaping Technique For Solid State Input Power Factor Conditioners," IECON 1989, vol. 1, Nov. 10, 1989, Philadelphia, Pa., US, pp. 99–105.

Saaw, L. J., European Search Report, The Hague, Feb. 19, 1993.

Primary Examiner—Thomas M. Dougherty
Assistant Examiner—Adolf Berhane
Attorney, Agent, or Firm—Morgan & Finnegan

[57] ABSTRACT

Adaptive control of converters is provided to achieve, in one case, a constant current characteristic by controlling input power as a function of the ratio of output voltage to output current. In another class of circuits, input current to the converter is controlled under an adaptive control arrangement in response to output voltage/output current ratios which may also be modified by input current or input voltage. The adaptive control may be augmented with low frequency negative feedback control loops.

15 Claims, 2 Drawing Sheets

ADAPTIVE CONTROL METHOD FOR POWER CONVERTERS

This is a continuation of co-pending application Ser. No. 07/815,763, filed on Jan. 9, 1992 now abandoned which is a continuation-in-part of co-pending application Ser. No. 07/650,733, filed on Feb. 5, 1991 now abandoned.

BACKGROUND OF THE INVENTION

This invention relates to power converters and more particularly, to adaptive control techniques for controlling such converters.

In Applicant's prior U.S. Pat. No. 4,600,984 there is disclosed a power supply regulating technique which employs adaptive control to reduce dependence on the use of classical closed loop technology. The adaptive control mechanism forces input power to a converter to follow the instantaneous power demand of the output.

The patented technique thus reduces reliance on the traditional time varying reference, error amplifiers and compensation networks (and the associated dynamics for generating a time varying voltage). It provides instead a circuit which has the potential to deliver the precise amount of power needed to generate a low distortion, pre-programmed waveform across the load, independently of the load characteristics. The technique minimizes output dynamic impedance and mitigates the effect of input voltage fluctuations.

While these features are significant, there is nevertheless a need for further improvements, especially in the dynamics of operation, in response time, in circuit compexity, and in adaptability to varied topologies and applications.

It is accordingly an object of the invention to provide such improvements.

SUMMARY OF THE INVENTION

The present invention is based upon the discovery that significant improvements in implementing desired power supply characteristics can be achieved using an adaptive control technique which monitors output current and voltage parameters and controls the input as a function of those parameters, and for some applications, other parameters as well.

There is provided according to the invention one technique wherein input current is constrained to be a function of a constant K and a control signal $v_c$. The latter in turn is a function of output power variables, or the ratio of output current to voltage, or the reciprocal thereof, or the output current, the choice depending on the desired characteristics. For some applications $v_c$ may also be a function of input variables, e.g., $v_i$, or $i_i$.

According to the invention, one method of regulating the output of a power converter comprises the steps of:
(1) monitoring the output voltage and current parameters;
(2) deriving a control function F by generating a control signal as a function of factors including said output current and output voltage;
(3) controlling the input current as a function of a constant K and said control function F. In another embodiment of the invention, a constant current characteristic is achieved by controlling input power as a function of a constant and the ratio of output voltage to output current, again in the context of an adaptive control system.

In still another embodiment of the invention, a substantially constant voltage output characteristic is achieved by controlling the input current as a function of a constant and the output current in the context of an adaptive control system.

As a consequence of these features the invention provides:
a) improved dynamics; the control circuit implements algebraic rather than differential equations.
b) very fast line/load transient response, determined solely by the energy storage elements.
c) a control circuit which is substantially invariant with respect to converter topology and operating regime (continuous or discontinuous).

DESCRIPTION OF DRAWINGS

Serving to illustrate the practice of the invention and exemplary embodiments thereof are the drawings of which.

INTRODUCTION

Figure 1:
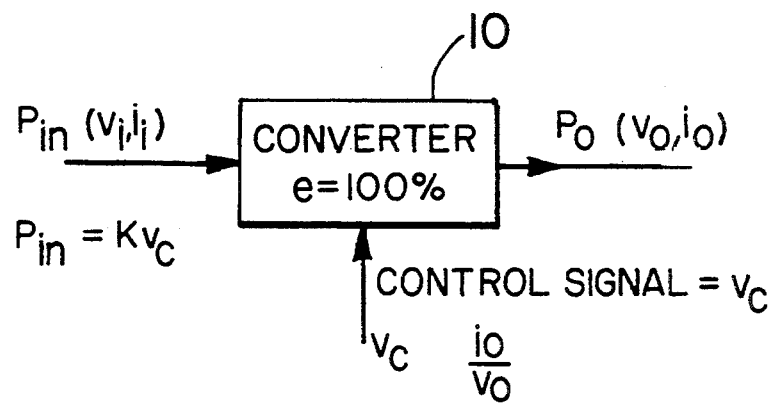
FIG. 1 is a block diagram illustrating certain signal relationships helpful to an understanding of the invention.

By way of background, FIG. 1 is provided to show certain underlying relationships which are also discussed in the above-noted U.S. Pat. No. 4,600,984. Shown is a generalized converter 10 that accepts an input voltage $V_i$, absorbs an input current $i_i$ and delivers output power $P_o$ which is equal to the input power $P_{in}$ (efficiency of 100% assumed).

It is also assumed that the converter follows the relationship:

$$P_i = K \cdot V_c \qquad (1)$$

where $v_c$ is a control signal and K is a constant.

As shown, a control voltage $v_c$ may be derived which is a function of the ratio of the output current to the output voltage, such that:

$$v_c = \frac{i_o}{v_o} \qquad (2)$$

In that event, the input power to the converter 10 will be:

$$P_i = K v_c = K \frac{i_o}{v_o} \qquad (3)$$

also $$P_i = P_o = i_o v_o \qquad (4)$$

Combining equations 3 and 4 and solving for $v_o$ we get $$K \frac{i_o}{v_o} = i_o v_o \tag{5}$$

$$v_o = \sqrt{K} \tag{6}$$

Equation 6 indicates that the adaptive control method referred to in the above cited patent renders the converter's output voltage insensitive to changes in its input voltage or output current.

Implementations of the Invention

It is now recognized that significant improvements can be achieved in exploiting the foregoing relationships.

Figure 2:
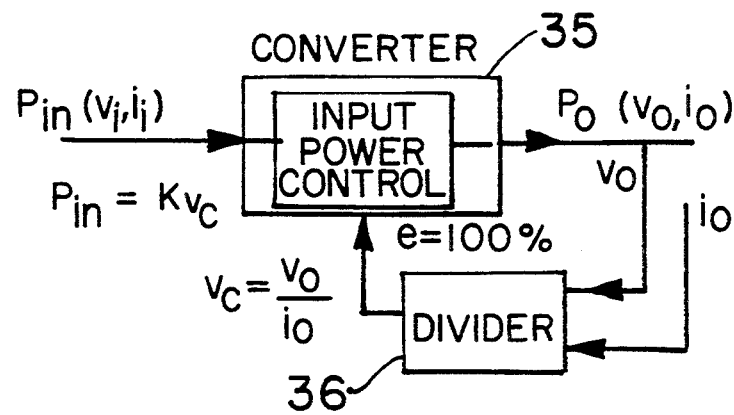
FIG. 2 is a block diagram illustrating one form of control used in practicing this invention.

It has been discovered for example that a simple expedient enables the converter to be operated as a current source. This is illustratively accomplished, as shown in FIG. 2, by controlling the $v_c$ signal applied to converter 35 such that:

$$v_c = \frac{v_o}{i_o} \tag{7}$$

resulting in:

$$i_o = \sqrt{K} \tag{8}$$

Thus by sensing $v_o$ and $i_o$, forming the ratio $v_o/i_o$, e.g., with a divider 36, and using that value to control $v_c$, a constant current characteristic can be achieved.

It has also been found that significant improvements occur when control over input current instead of input power is practised. To that end, a form of adaptive control illustrated in FIG. 3 may be employed wherein input current $i_i$ is controlled in dependence on K and $v_c$. In controlling $i_i$, there are several methods for generating $v_c$. These include:

Method a

Signal $v_c$ is generated by $$v_c = \frac{i_o}{v_i v_o} \tag{9}$$

therefore:

$$i_i = K v_c = K \frac{i_o}{v_i v_o} \tag{10}$$

Figure 3:
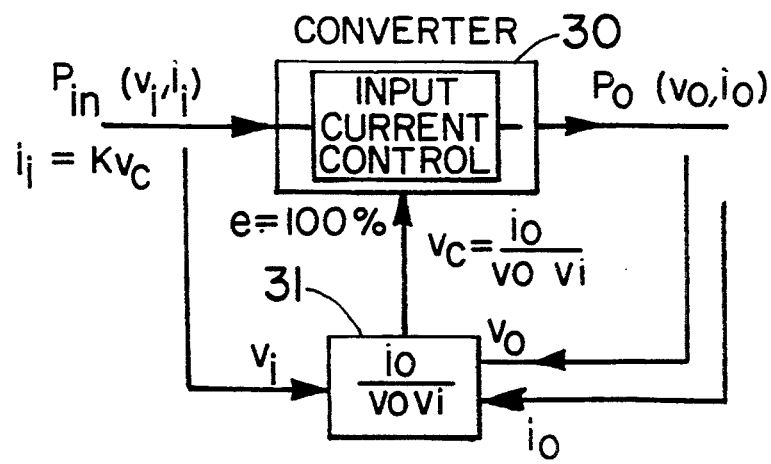
FIG. 3 is a block diagram illustrating another form of control employed in the practice of the invention.

Calculating $P_{in}$ from eq 10 yields:

$$P_i = i_i * v_i = \frac{K * i_o}{v_i v_o} * v_i \tag{11}$$

$$P_i = \frac{K * i_o}{v_o} \tag{12}$$

which is identical to equation 3 indicating that the idealized performance of the circuit of FIG. 3 is identical to that of FIG. 1.

Method b

The control signal is generated by:

$$v_c = \frac{i_o}{v_o} \tag{13}$$

Appropriate algebraic operations will yield:

$$v_o = \sqrt{v_i k} \tag{14}$$

This method provides a $\sqrt{2}$ factor of attenuation of input voltage changes and complete rejection of output load transients.

Method c

The control signal is generated by:

$$v_c = i_o \tag{15}$$

Appropriate algebraic operations will yield:

$$v_o = k v_i \tag{16}$$

This method does not provide an attenuation of input voltage changes. However, it provides complete rejection of output load transients. As a result the control circuit according to this method is simplified.

In practical implementations of these control circuits it is typically necessary to compensate for offsets, drifts of various parameters with temperature, etc.

Additionally, the assumption of 100% efficiency is not realizable, resulting in a deficit of power at the output and consequently an incorrect output voltage/current value.

All these errors can be categorized as multiplicative or additive as follows:

$$P_i = P_o + P_{loss} \tag{17}$$

$$P_i = (K * K_e) * \frac{i_o}{v_o} \tag{18}$$

$$K * K_e * \frac{i_o}{v_o} = v_o i_o + P_{loss} \tag{19}$$

$$v_o = \sqrt{K * K_e - P_{loss} * \frac{v_o}{i_o}} \tag{20}$$

Figure 4:
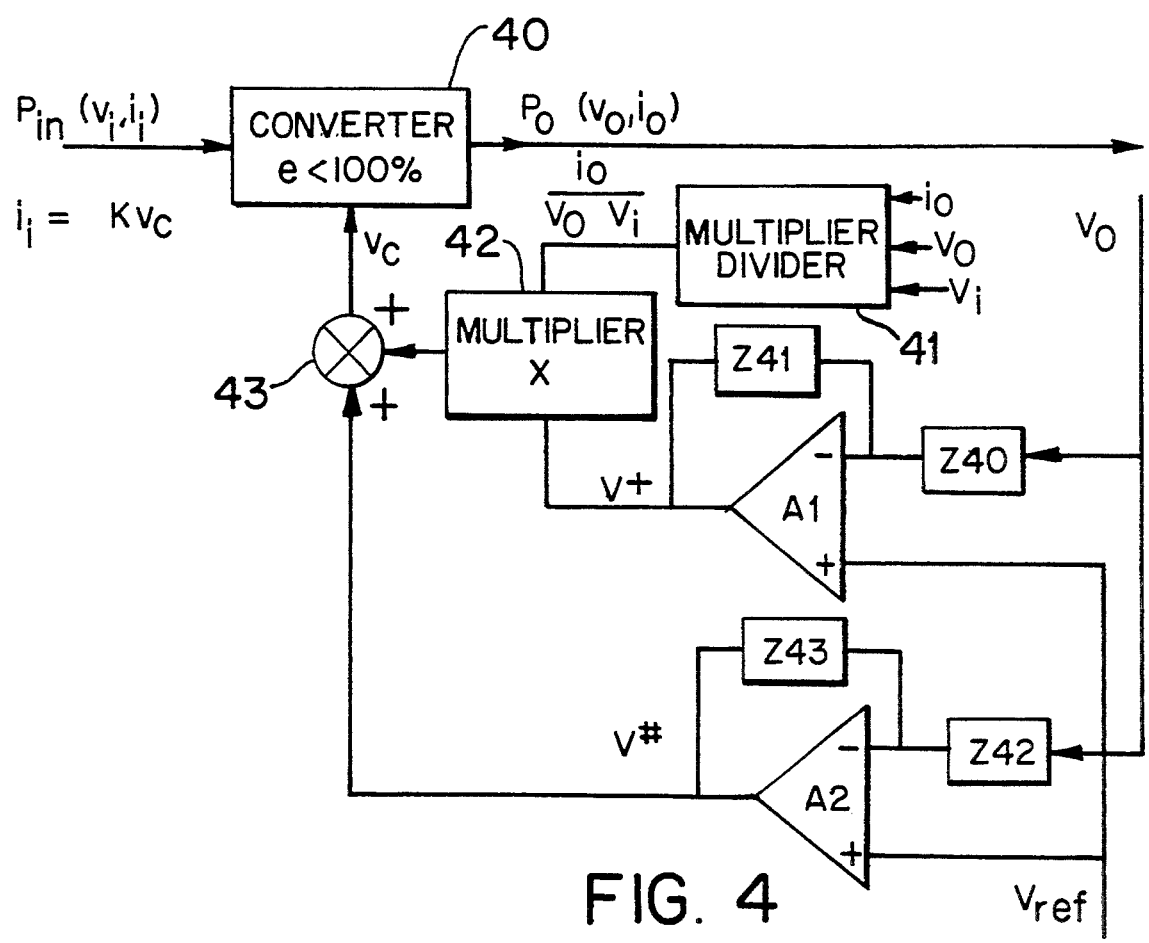
FIG. 4 is a more detailed block diagram illustrating an embodiment of the invention which includes certain compensation techniques.

We will define $K_e$ to be the multiplicative error and $P_{loss}(v_o/i_o)$ the additive error. Keeping in mind that the bulk of these errors are either time invariant or vary very slowly in time and are largely independent of the input voltage and output load (except $P_{loss}$) we can now devise an "outer", "DC" (very slow) loop that will correct for these errors and provide a highly accurate steady state value. One possible implementation is shown in FIG. 4.

In the illustrated circuit, the converter 40 receives the input power $P_{in}$ and supplies output power $P_o$ having the output voltage and output current $v_o$ and $i_o$ as components.

The input current $i_i$ is controlled as a function of a constant K and the control voltage $v_c$.

To generate vc, the output current $i_o$ and voltage $v_o$ and the input voltage $v_i$ are applied to a multiplier/divider 41, the output of which is $i_o/(v_o v_i)$. This signal is applied to multiplier 42 along with a V+ signal derived from an amplifier A1. The output voltage $v_o$ and a reference voltage $V_{ref}$ are the inputs to amplifier A1.

The output from multiplier 42 is applied to a differential output 43 along with a signal V* derived from an amplifier A2 which also receives the inputs $V_o$ and $V_f$.

The two error amplifiers $A_1$ and $A_2$ generate an additive correction factor V+ and a multiplicative correction factor V, respectively that will force:

$$K*K_e*V^* = K \qquad (21)$$

$$P_{loss} = KK_eV^+ \qquad (22)$$

resulting again in:

$$V_o = \sqrt{K} \qquad (23)$$

It is interesting to note that either amplifier $A_1$ or $A_2$ can provide full steady state correction for both the multiplicative and additive errors but if a large multiplicative is corrected by the additive amplifier, (or vice versa) the adaptive control circuit is defeated and the system degenerates into a conventional feedback control system. In practice, only one type of error may be dominant and therefore only one amplifier may be necessary, the other type of correction being either neglected or corrected by a constant.

It must be noted that the issue of errors has been addressed here only in a limited way. Other errors may be present in the circuit, such as voltage and current-sensing errors, various offsets etc. But all these errors can be either multiplicative or additive and can be corrected by adequate terms applied at the appropriate point in the circuit.

The inner control loop: implementing input current control

As mentioned previously, the proposed adaptive control method depends on the converter extracting from its input energy source a current proportional to a control voltage. These characteristics can be implemented by a number of control methods:

(1) Control of input power—pulsed input current converters

Figure 5:
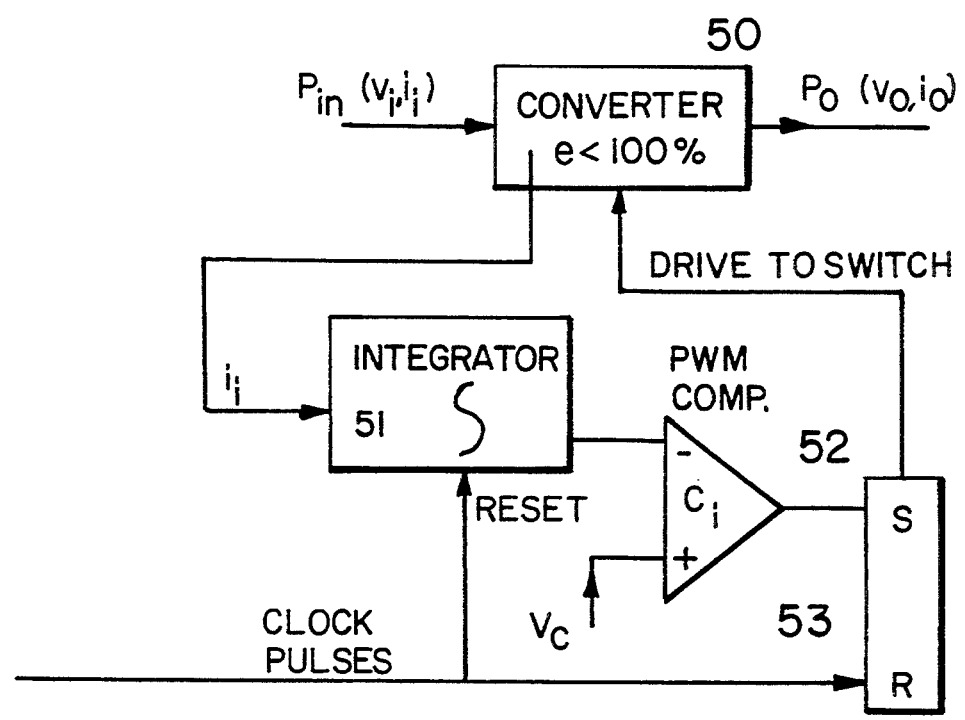
FIG. 5 is a block diagrams illustrating the employment of input current sensing and processing techniques.

This method illustrated with the aid of FIG. 5, applies to converters having pulsed input current, such as buck and buck-boost derived converters. The converter 50 absorbs power from its input source only during the conduction time of its power switch; the input current, which is the switch current in this case, is sensed and a signal representing that current is fed to and integrated by an integrator 51. When the value of the integral becomes equal to the value of the control voltage $v_c$, the PWM comparator 52 turns on the switch of converter 50 via flip-flop 53.

A clock pulse resets the output of the integrator to zero and turns on the switch at a constant frequency f. The above operation can be described mathematically as:

$$\int_{t}^{t + t_{on}} i_i dt = v_c \qquad (24)$$

and since $$i_i(ave) = \frac{1}{T} \int_{t}^{t + t_{on}} i_i dt \qquad (25)$$

we get $$i_i(ave) = f^*v_c \qquad (26)$$

exactly as required.

It is interesting that the small signal transfer function would be intuitively expected to be flat up to almost the switching frequency since the circuit provides a cycle-by-cycle correction; measurements in actual circuits confirm this expectation.

(2) Controls for converters having non-pulsating input currents

These converters absorb power from their input source continuously; their input current is not the same as their switch current. The circuit referred to in (1) above is therefore implemented with the actual input current $i_i$ as the integrator input.

The integrator will be reset immediately following the turn-off of the switch; the reset duration must be negligible relative to the switching period and the integration process must be resumed immediately thereafter.

Other Applications

The adaptive control described above, as applied to various topologies, will allow synthesis of switching converters having a large signal transient response limited only by their power conversion train parameters and small signal bandwidths approaching their switching frequency. These characteristics should prove beneficial when rapid programming of the output is required as in cases where generation of AC waveforms is involved.

Two such situations that come to mind are power factor/harmonics correction and DC to AC inverters. In these applications, the bandwidth of the control circuits is generally low and sub cycle corrections of the waveform for step or nonlinear loads are generally impossible. These limitations are easily overcome when the circuits proposed here are used for control.

What is claimed is:

1. A method of regulating the output of a power converter comprising the steps of:
   (1) monitoring the output voltage and current parameters of said power converter;
   (2) deriving a control function by generating a control signal as a function of factors including a ratio between said output current and said output voltage;
   (3) sensing the input current such that the average of said input current is maintained as a function of a constant and said control function.

2. The method according to claim 1, further comprising the step of using an input parameter in deriving said control function.

3. The method according to claim 1 or 2 in which said factors include the ratio of output current to output voltage.

4. The method according to claim 1 or 2 in which said factors include the ratio of output voltage to output current.

5. The method according to claim 1 or 2 including the step of compensating for non-ideal circuit conditions with the aid of a control loop having a long time constant.

6. The method according to claim 2 in which said input parameter is the input voltage or the input current.

7. The method according to claim 2, wherein said input parameter is input voltage and said control function is a ratio of said output current, to a multiple of said output voltage and said input voltage.

8. A power converter employing adaptive control, said power converter comprising:
 (1) an input circuit including means for sensing input current;
 (2) an output load supplying circuit including means for sensing output current; and
 (3) an adaptive control circuit including means for controlling said input current, said adaptive control circuit being configured to be responsive to said output current such that the average of said input current is maintained as a function of a constant and said output current;
 wherein said converter provides a substantially constant output voltage characteristic.

9. A system according to claim 8 including a low frequency negative feedback control loop responsive to said output voltage and a reference voltage and coupled to said control circuit for compensating for drift, power loss and other non-ideal conditions.

10. A method of regulating the output of a power converter comprising the steps of:
 (1) monitoring the output current;
 (2) deriving a control function by generating a control signal as a function of said output current only;
 (3) sensing the input current such that the average of said input current is maintained as a function of a constant and said output current.

11. A power converter employing adaptive control, said power converter comprising:
 (1) an input circuit including means for sensing input current;
 (2) an output load supplying circuit including means for sensing output current and output voltage; and
 (3) an adaptive control circuit including means for controlling said input current, said adaptive control circuit being configured to be responsive to a ratio between said output voltage and said output current such that the average of said input current is maintained as a function of a constant and said ratio; wherein said converter provides a substantially constant output characteristic.

12. The system according to claim 11 in which said ratio comprises the ratio of output current to output voltage thereby imparting a constant output voltage characteristic to said converter.

13. The system according to claim 11 in which said ratio comprises the ratio of output voltage to output current thereby imparting a constant output current characteristic to said converter.

14. The system according to claim 11 wherein said control voltage is also responsive to input voltage.

15. The system according to claim 11 including a low frequency negative feedback control loop responsive to said output voltage and a reference voltage and coupled to said control circuit for compensating for drift, power loss and other non-ideal conditions.

* * * * *